US011100879B2

(12) United States Patent
Guo (10) Patent No.: US 11,100,879 B2
(45) Date of Patent: Aug. 24, 2021

(54) DRIVING CIRCUIT OF DISPLAY PANEL, DISPLAY APPARATUS, DRIVING METHOD, AND COMPUTER STORAGE MEDIUM (71) Applicants: HKC Corporation Limited, Guangdong (CN); Chongqing HKC Optoelectronics Technology Co., Ltd., Chongqing (CN)

(72) Inventor: Dongsheng Guo, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 22 days.

(21) Appl. No.: 16/627,758

(22) PCT Filed: Jun. 21, 2018

(86) PCT No.: PCT/CN2018/092235
§ 371 (c)(1),
(2) Date: Dec. 30, 2019

(87) PCT Pub. No.: WO2019/134350
PCT Pub. Date: Jul. 11, 2019

(65) Prior Publication Data
US 2021/0158770 A1    May 27, 2021

(30) Foreign Application Priority Data

Jan. 8, 2018  (CN) .......................... 201810020490.X (51) Int. Cl.
*G09G 3/36*      (2006.01)
*G02F 1/133*     (2006.01)
*G02F 1/1345*    (2006.01)

(52) U.S. Cl.
CPC ....... *G09G 3/3677* (2013.01); *G02F 1/13306* (2013.01); *G02F 1/13452* (2013.01);
(Continued)

(58) Field of Classification Search
CPC ............... G09G 3/3677; G09G 3/3696; G09G 2330/00; G09G 2320/0233; G02F 1/13306; G02F 1/13452
See application file for complete search history.

(56) References Cited

U.S. PATENT DOCUMENTS 10,902,816 B2 * 1/2021 Liu ...................... G09G 3/3696
2005/0001792 A1 1/2005 Watanabe et al.
(Continued)

FOREIGN PATENT DOCUMENTS

CN    101071215 A    11/2007
CN    101313349 A    11/2008
(Continued)

OTHER PUBLICATIONS

International Search Report of PCT Patent Application No. PCT/CN2018/092235 dated Oct. 16, 2018.

*Primary Examiner* — Vinh T Lam (57) ABSTRACT

Disclosed are a driving circuit of a display panel, a display apparatus, and a driving method of a display panel, as well as a computer storage medium. The driver circuit includes a sub-pixel unit and a driving line, the driving line is connected to first ends of a plurality of sub-pixel units. The driver circuit further includes a compensation unit, the driving line is defined with the compensation unit. The compensation unit includes: a voltage compensation module, configured to provide a compensation voltage for the output of the driving line; and a switch module, the switch module controlling the voltage compensation module to discharge, when the driving line outputs a signal.

16 Claims, 5 Drawing Sheets (52) U.S. Cl.
CPC ... *G09G 3/3696* (2013.01); *G09G 2320/0233* (2013.01); *G09G 2330/00* (2013.01)

(56) References Cited

U.S. PATENT DOCUMENTS

| | | | | |
|---|---|---|---|---|
| 2013/0120344 | A1* | 5/2013 | Liao | G06F 3/041 |
| | | | | 345/212 |
| 2013/0300777 | A1* | 11/2013 | Kimura | G09G 3/22 |
| | | | | 345/690 |
| 2015/0138182 | A1* | 5/2015 | Tu | H03M 1/804 |
| | | | | 345/212 |
| 2016/0049136 | A1* | 2/2016 | Seo | G09G 3/3677 |
| | | | | 345/213 |
| 2017/0110079 | A1* | 4/2017 | Koo | G09G 3/3688 |
| 2017/0116917 | A1* | 4/2017 | Sun | G09G 3/3233 |
| 2017/0124979 | A1* | 5/2017 | Huang | H01L 27/1259 |
| 2017/0154606 | A1* | 6/2017 | Shin | G09G 3/20 |
| 2017/0186354 | A1* | 6/2017 | Zhang | G09G 3/2007 |
| 2017/0193950 | A1* | 7/2017 | Kim | G09G 3/3677 |
| 2018/0040275 | A1* | 2/2018 | Wu | G09G 3/3233 |
| 2018/0062238 | A1* | 3/2018 | Haziza | H01P 1/268 |
| 2018/0114487 | A1* | 4/2018 | He | G09G 3/32 |
| 2018/0137816 | A1* | 5/2018 | Cheng | G09G 3/30 |
| 2018/0336844 | A1* | 11/2018 | Shi | G09G 3/3413 |
| 2018/0336845 | A1* | 11/2018 | Shi | G09G 3/3225 |
| 2019/0165471 | A1* | 5/2019 | Takahashi | H01Q 13/22 |

FOREIGN PATENT DOCUMENTS

| | | | |
|---|---|---|---|
| CN | 101320179 | A | 12/2008 |
| CN | 102592567 | A | 7/2012 |
| CN | 104200770 | A | 12/2014 |
| CN | 106328060 | A | 1/2017 |
| CN | 106328062 | A | 1/2017 |

* cited by examiner

DRIVING CIRCUIT OF DISPLAY PANEL, DISPLAY APPARATUS, DRIVING METHOD, AND COMPUTER STORAGE MEDIUM

FIELD

The present disclosure relates to the field of liquid crystal display, and more particularly relates to a driving circuit of a display panel, a display apparatus, a driving method of a display panel, and a computer storage medium.

BACKGROUND

Liquid crystal display is a flat panel display apparatus that displays images utilizing characteristics of liquid crystal material. When the liquid crystal display is in use, signal is output by a gate driving line to control a switch tube of a liquid crystal cell to be on or off, so as to control the display of images. As the wiring of the liquid crystal display screen needs to be arranged in the glass panel, the resistance of the conducting wires is large, resulting in distortion of the signal output by the gate driving module, which would further lead to uneven brightness of displayed images. In the prior art, these impacts are eliminated by equal impedance matching of sub-units in the liquid crystal display, but the elimination effect is limited, and deviation may occur in the manufacturing process which would cause display deviation between the sub-units, the effect is poor.

SUMMARY

The present disclosure provides a driving circuit of a display panel, aiming to compensate for distortion of gate driving signal, and improve display quality of images of a liquid crystal screen.

In order to realize the above aim, the present disclosure provides a driving circuit of a display panel. The display panel includes a substrate, an optical filter, and a pixel liquid crystal unit. The driving circuit of the display panel includes:

a plurality of sub-pixel units and a driving line, the driving line being connected to first ends of the plurality of sub-pixel units, the driving circuit further including:

a compensation unit, the driving line being defined with the compensation unit;

the compensation unit includes:

a voltage compensation module, configured to provide a compensation voltage for the output of the driving line; and a switch module, the switch module controlling the voltage compensation module to discharge, when the driving line outputs a signal.

In some embodiments of the present disclosure, a controlled end of the switch module is connected to the driving line, an output end of the switch module is also connected to the driving line, an input end of the switch module is connected to a first end of the voltage compensation module, and the input end of the switch module is also connected to a power supply;

a second end of the voltage compensation module is electrically connected to the display panel.

In some embodiments of the present disclosure, the voltage compensation module includes a capacitor, a first end of the capacitor is connected to the input end of the switch module, and a second end of the capacitor is electrically connected to the display panel.

In some embodiments of the present disclosure, the switch module includes a switch tube, a first end of the switch tube is connected to the driving line, a second end of the switch tube is also connected to the driving line, and a third end of the switch tube is connected to the first end of the voltage compensation module.

In some embodiments of the present disclosure, the impedance value between the driving line and the power supply is proportional to the capacitance value of the capacitor connected to the driving line.

In some embodiments of the present disclosure, the compensation unit includes at least two capacitors with a same capacitance value, the capacitors are connected in parallel, and the impedance value between the driving line and the power supply is proportional to the number of the capacitors connected to the driving line.

In some embodiments of the present disclosure, the second end of the voltage compensation module and the gate driving unit of the liquid crystal display screen are connected to a same power supply, and the controlled end and the output end of the switch module are connected to the driving line between the gate driving unit and the sub-pixel unit.

The present disclosure also provides a display apparatus, including a driving circuit which is capable of compensating the gate signal, and including a plurality of sub-pixel units and a plurality of driving lines, each of the driving lines is connected to gates of the plurality of sub-pixel units. The driving circuit further includes a compensation unit, the driving line is defined with the compensation unit; each of the compensation units include a switch module and a voltage compensation module. The voltage compensation module is configured to provide a compensation voltage for the output of the driving line; and the switch module controls the voltage compensation module to discharge, when the driving line outputs a signal.

The present disclosure also provides a driving method of a display panel, which is applied to a gate driver circuit of a display panel, the driving method includes:

switching on a switch module when a driving line is powered on;

providing compensation charge to the voltage of the driving line by a voltage compensation module with charge storage function, when the switch module is switched on.

In some embodiments of the present disclosure, the impedance value between a gate line and a power supply is proportional to the quantity of the compensation charge.

The present disclosure also provides a computer storage medium. The computer storage medium stores a driving program, the driving program when being executed performs the driving method of the display panel as described above.

According to the technical solution of the present disclosure, the compensation unit including the switch module and the voltage compensation module is provided on each of the driving lines, to form a driving circuit with gate signal compensation. The switch module is controlled by the output of the driving line. When the driving line outputs a signal, the switch module is switched on, and controls the voltage compensation module to output a compensation voltage to the gates of all sub-pixel units which are connected to the driving line, so as to achieve the purpose of voltage compensation for the signal output by the driving line, improving the image quality of the liquid crystal display screen.

BRIEF DESCRIPTION OF THE DRAWINGS

In order to more clearly illustrate the embodiments of the present disclosure or the technical solutions in the prior art, the drawings used in the embodiments or the prior art description will be briefly introduced below. Obviously, the drawings in the following description are merely some of the embodiments of the present disclosure, and those skilled in the art can obtain other drawings according to the structures shown in the drawings without any creative work.

| Reference signs description: | | | |
| --- | --- | --- | --- |
| sign | name | sign | name |
| 100 | compensation unit | 120 | voltage compensation module |
| 200 | gate driving unit | Q1 | switch tube |
| 300 | sub-pixel unit | C1 | capacitor |
| 110 | switch module | | |

The realizing of the aim, functional characteristics and advantages of the present disclosure are further described in detail with reference to the accompanying drawings and the embodiments.

DETAILED DESCRIPTION OF THE EMBODIMENTS

The technical solutions in the embodiments of the present disclosure will be described clearly and completely combining the drawings in the embodiments of the present disclosure. Obviously, the described embodiments are only a part of the embodiments of the present disclosure, but not all of them. Based on the embodiments in the present disclosure, all other embodiments obtained by those skilled in the art without creative work shall belong to the protection scope of the present disclosure.

It should be understand that, all directional indications (such as "upper", "lower", "left", "right", "front", "back" . . . ) in the embodiments of the present disclosure are only used to explain the relative positional relationship, motion, and the like, between components in a certain posture. If the particular posture changes, the directional indication changes accordingly.

Moreover, terms such as "first" and "second" are used herein for purposes of description and are not intended to indicate or imply relative importance or to imply the number of indicated technical features. Thus, the features defined with "first" and "second" may comprise or imply at least one of these features. In addition, the technical solutions between the various embodiments of the present disclosure may be combined with each other, but must be based on the realization of those skilled in the art. When the combination of technical solutions is contradictory or impossible to implement, it should be considered that the combination of the technical solutions does not exist, and not within the scope of protection required by this disclosure.

The present disclosure provides a driving circuit with gate signal compensation.

Figure 1:
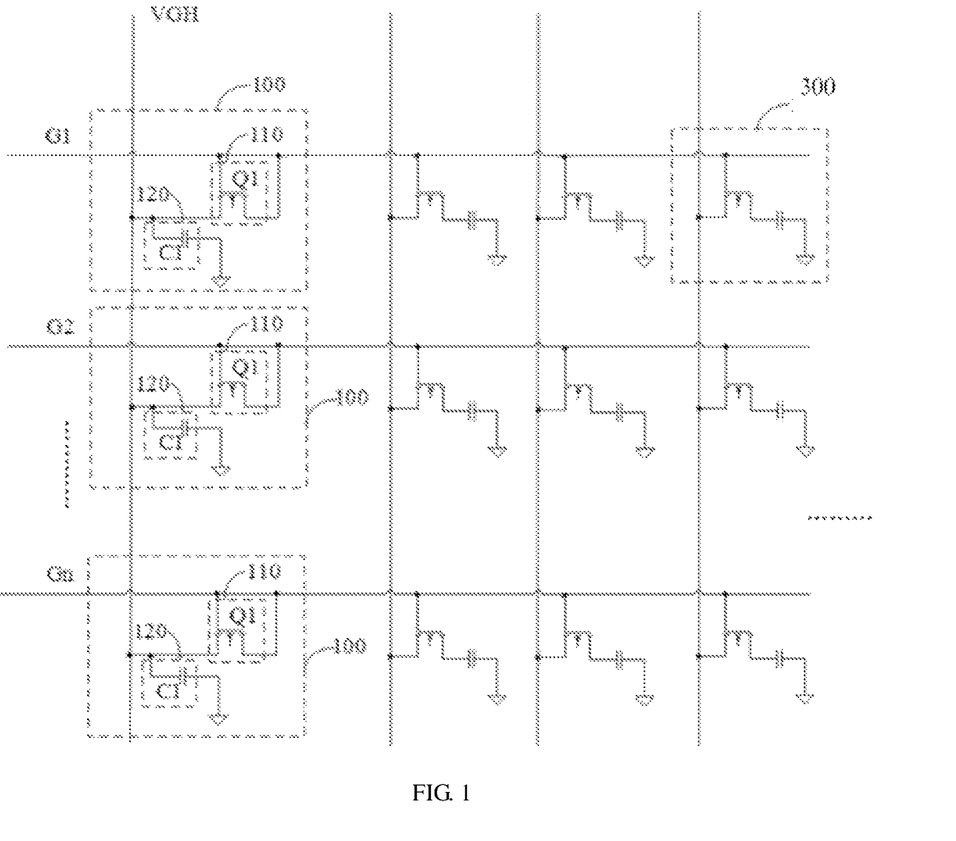
FIG. 1 is a circuit diagram of an embodiment of a driving circuit with gate signal compensation according to the present disclosure.

Referring to FIG. 1, the driving circuit with gate signal compensation includes a plurality of sub-pixel units 300 and a plurality of driving lines. The driving line is a gate driving line. The gate driving line is connected to first ends of the plurality of sub-pixel units 300. A first end of the sub-pixel unit is the gate of the sub-pixel unit. The driving circuit with gate signal compensation also includes a compensation unit 100. Each of the gate driving lines is provided with the compensation unit 100. Each compensation unit 100 includes a switch module 110 and a voltage compensation module 120. The voltage compensation module 120 provides a compensation voltage for the output of the gate driving line. The switch module 110 controls the voltage compensation module 120 to discharge, when the gate driving line outputs a signal.

It should be noted that, in use, a power supply is connected in series to a plurality of gate driving units 200. Output ends of each gate driving unit 200 are respectively connected to multiple gate driving lines as shown, each gate driving line is also connected to gates of switch tubes of multiple sub-pixel units. When the liquid crystal screen is in operation, the sub-pixel units connected to the gate driving line are controlled to work by the signals output by the gate driving unit 200.

Figure 2:
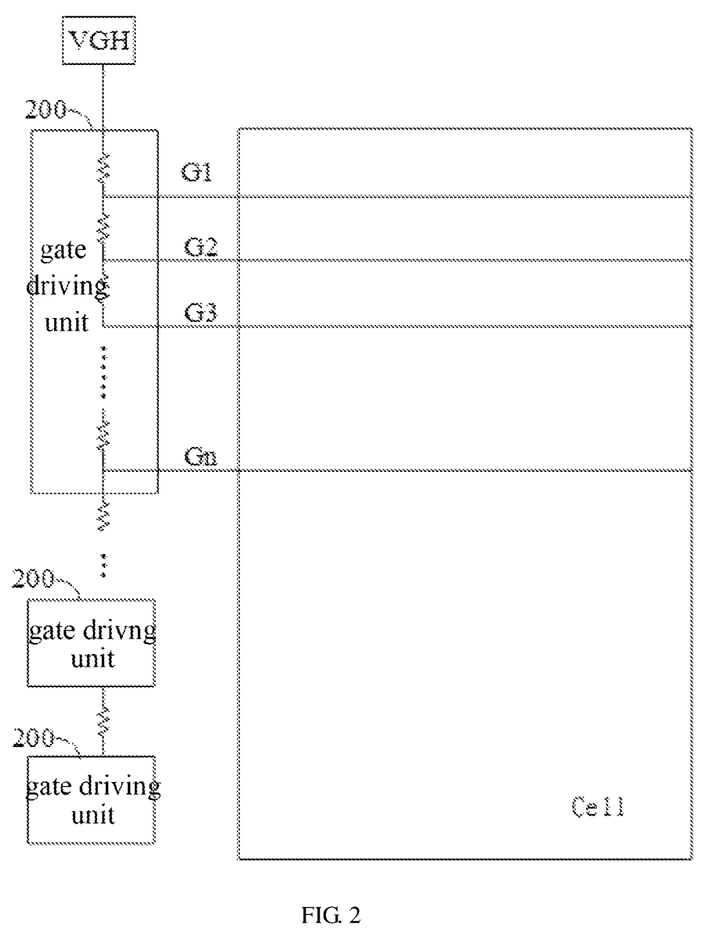
FIG. 2 is a schematic diagram of a gate driving module.

Referring to FIG. 2, since the wiring of the thin film transistor (TFT) liquid crystal display panel is arranged in the glass panel, the resistance value of the connecting lines is large and could not be ignored. Therefore, the impedance between the output end of the power supply and the gate driving line G1 as shown is small, while the impedance between the output end of the power supply and the gate driving line G2 is larger than the impedance between the output end of the power supply and the G1, causing the impedance between the gate driving output line and the power supply to gradually increase.

Figure 3:
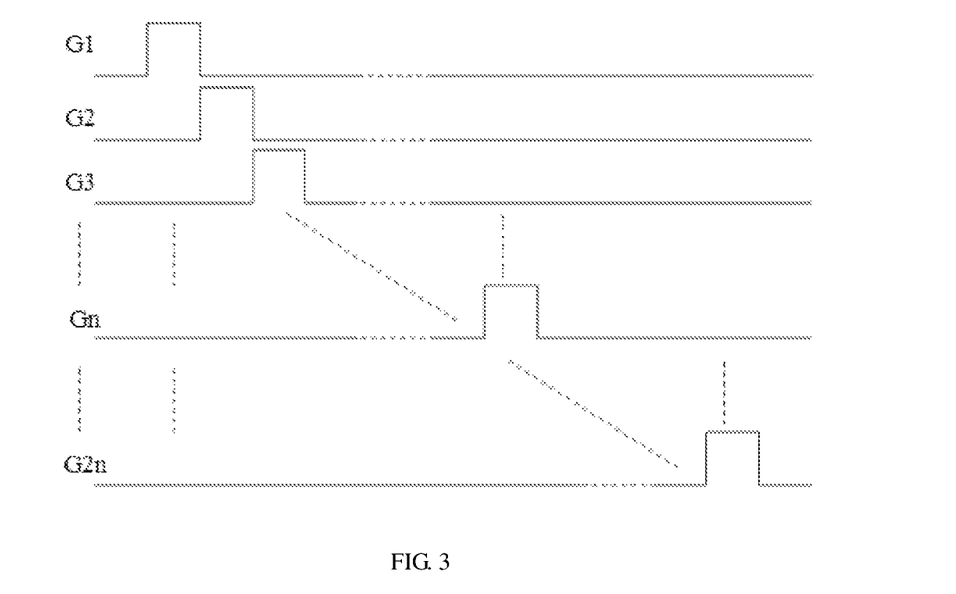
FIG. 3 is an ideal output waveform diagram of the gate driving unit.
Figure 4:
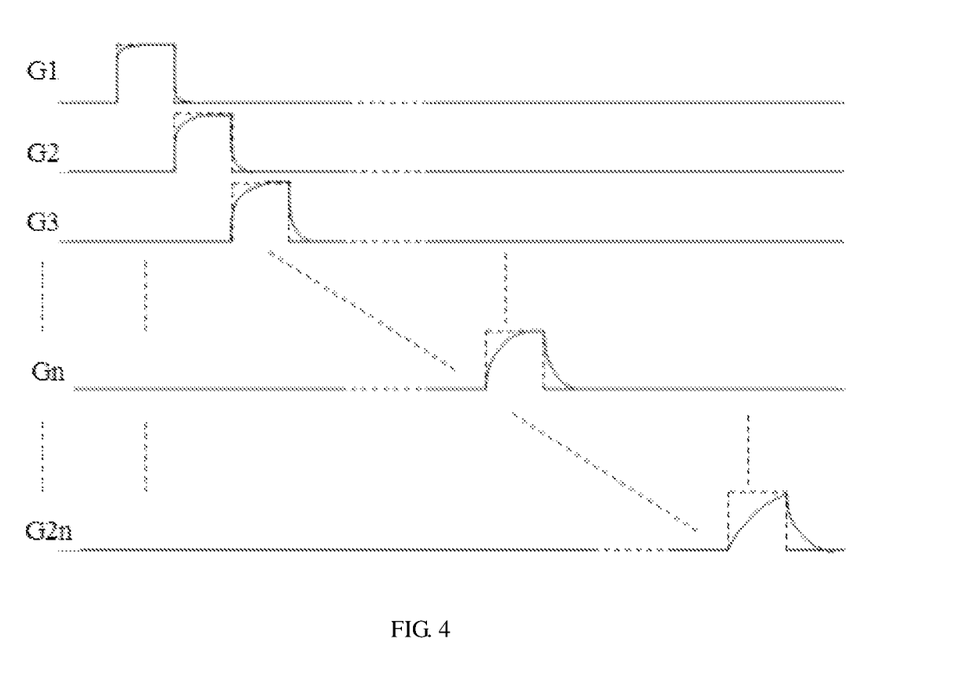
FIG. 4 is an actual output waveform diagram of the gate driving unit.
Figure 5:
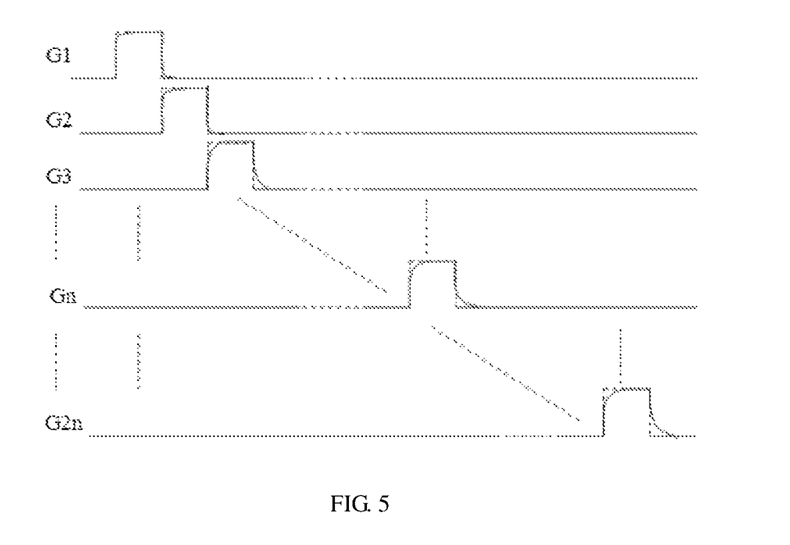
FIG. 5 is an actual output waveform diagram of the gate driving unit, which is processed by the driving circuit with gate signal compensation according to the present disclosure.

The ideal signal waveform output by the gate driving unit 200 is shown in FIG. 3. Due to the influence of impedance between the power supply and the gate driving line, the signal waveform output by the gate driving line is actually shown in FIG. 4. The purpose of the technical solution according to the present disclosure is to reduce distortion of the signal output by the gate driving unit, and increase the climbing speed of the signal voltage. When the gate driving unit 200 outputs a high level, the voltage compensation is performed on the high level, so that the voltage at the rising edge of the signal as shown in FIG. 4 is superimposed with the compensation voltage, which indicates the voltage climbing speed. The waveform of the signal compensated by the driving circuit with the gate signal compensation is shown in FIG. 5.

According to the technical solution of the present disclosure, the compensation unit 100 including the switch module 110 and the voltage compensation module 120 is arranged on each gate driving line, so as to form a driving circuit with gate signal compensation. The switch module 110 is controlled by the output of the gate driving line. When the gate driving line outputs the signal, the switch module 110 is switched on, and controls the voltage compensation module 120 to output the compensation voltage to gates of all the sub-pixel units connected to the gate driving line, to achieve the effect of the voltage compensation on the signal output by the gate driving line. The present disclosure achieves the effect of compensating the climbing voltage of the gate, and improving the image quality of the liquid crystal screen.

The controlled end of the switch module 110 is connected to the gate driving line, the output end of the switch module 110 is also connected to the gate driving line, the input end of the switch module 110 is connected to the first end of the voltage compensation module 120, the input end of the switch module 110 is also connected to the power supply, and the second end of the voltage compensation module 120 is electrically connected to the display panel.

It should be noted that, the above connection way provides a simple route alignment, which could effectively save space.

The voltage compensation module 120 includes a capacitor C1, a first terminal of the capacitor C1 is connected to an input end of the switch module 110, and a second end of the capacitor C1 is electrically connected to the display panel.

Figure 6:
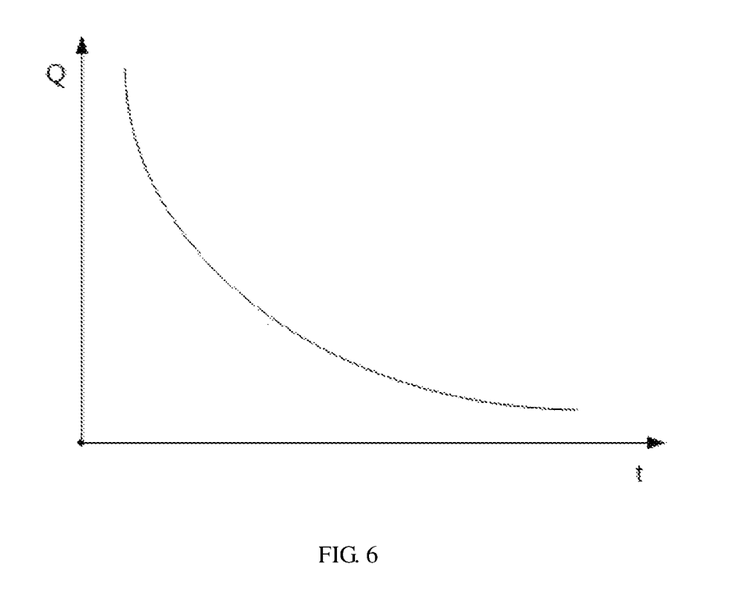
FIG. 6 is a relationship diagram of quantity of charge versus time during the capacitor discharges.

Referring to FIGS. 6 and 4, the relationship between the charge release of the capacitor C1 and time is shown in the figures. At the moment when the switch module 110 is switched on, the charge release rate of the capacitor C1 is maximum, and then gradually decreases with time. At the moment when the gate driving unit 200 outputs the voltage, the voltage output by the capacitor C1 is maximum, so that the voltage output by the gate driving unit 200 quickly climbs to a required voltage, realizing a better voltage compensation.

The switch module 110 includes a switch tube Q1, a first end of the switch tube Q1 is connected to the gate driving line, a second end of the switch tube Q1 is also connected to the gate driving line, and a third end of the switch tube Q1 is connected to the first end of the voltage compensation module 120. The first end is the gate of the switching tube Q1, the second end is the source of the switching tube Q1, and the third end is the source of the switching tube Q1.

It should be noted that, in the embodiment of the present disclosure, the switching module is realized by the switching tube Q1, and the gate of the switching tube Q1 is under the control of the gate driving unit 200. When the voltage of the gate of the switching tube Q1 reaches the on voltage, the voltage compensation module 120 could be controlled to perform voltage compensation.

The impedance value between the gate driving line and the power supply is proportional to the capacitance value of the capacitor C1 connected to the gate driving line.

Referring to FIGS. 2 and 4, since the impedances between the gate driving line and the power supply gradually increase from G1 to Gn, the distortion of the signals output by the gate driving lines G1 to Gn also gradually become serious. By setting the capacitor C1 to gradually increase from G1 to Gn, the compensation voltages matching the gate driving line also gradually increase, which further increases the climbing speed of the voltage of the gate driving line.

The compensation unit 100 includes at least two capacitors C1 with a same capacitance value. The capacitors C1 are connected in parallel. The impedance value between the gate driving line and the power supply is proportional to the number of the capacitors C1 connected to the gate driving line.

Similarly, to realize gradually increasing the compensation charge, it could done by increasing the number of the capacitors C1 connected in parallel, thereby further increasing the climbing speed of the voltage of the gate driving line.

The switch tube Q1 is realized by an MOS tube.

It should be noted that, the N-type MOS transistor (metal-oxide-semiconductor) is beneficial for the integration of the circuit, reducing the volume and power consumption.

The second end of the voltage compensation module 120 and the gate driving unit 200 of the liquid crystal display screen are connected to a same power source.

It should be noted that, the compensation module 100 and the gate driving unit 200 use a same power supply, reducing the volume of the circuit, and saving the costs.

The controlled end and the output end of the switch module 110 are connected to the gate driving line between the gate driving unit 200 and the sub-pixel unit 300.

It should be noted that, the compensation module 100 is disposed at the output end of the gate driving unit 200, which facilitates the industrial production of the liquid crystal display circuit, and saves the production costs.

In the present disclosure, by providing a compensation unit 100 on each of the gate driver lines, the driver circuit with the gate signal compensation is realized. When the gate driving line outputs a signal, the switch tube Q1 is switched on, and the capacitor C1 is discharged, thereby compensating for the voltage climbing speed of the signal of the gate driving line. And by setting different capacitances, setting a capacitor having larger capacitance for the line with a more serious waveform distortion, a better voltage compensation is realized. The present disclosure could effectively improve the image quality of the liquid crystal display screen.

The present disclosure also provides a display apparatus, which includes a display panel, a gate driving unit, a source driving unit and a driving circuit with gate signal compensation as described above. The source driving unit is connected to the source driving line in the display panel, the gate driving unit is connected to the gate driving line in the display panel, and the driving circuit with gate signal compensation is also connected to the gate driving line in the display panel. The specific structure of the driving circuit with gate signal compensation refers to the above embodiments. Since the display apparatus adopts all the technical solutions of all the above embodiments, it has at least all the beneficial effects brought about by the technical solutions of the above embodiments and will not be described in detail herein.

Figure 7:
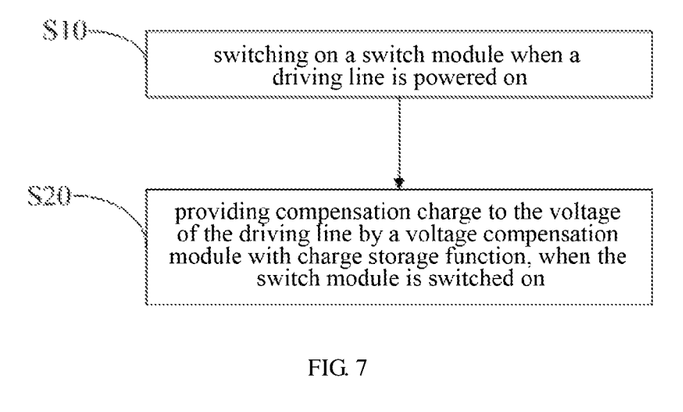
FIG. 7 is a flowchart diagram of an embodiment of a driving method of a display panel according to the disclosure.

Referring to FIG. 7, the present disclosure also provides a driving method of a display panel, which is applied to a gate driving circuit of the display panel. The method includes:

S10: switching on a switch module 110 when a driving line is powered on;

S20: providing compensation charge to the voltage of the driving line by a voltage compensation module with charge storage function, when the switch module is switched on.

Specifically, the impedance value between a gate line and a power supply is proportional to the quantity of the compensation charge.

Those skilled in the art should understand that, the present disclosure also provides a computer storage medium. The computer storage medium stores a driving program, the driving program when being executed performs the driving method of the display panel as described above.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A driving circuit of a display panel, the display panel comprising a substrate, an optical filter, and a pixel liquid crystal unit, the driving circuit of the display panel comprising:
a plurality of sub-pixel units and a plurality of driving lines comprising a driving line G1, a driving line Gn and driving lines between the driving line G1 and the driving line Gn, each of the plurality of driving lines being connected to a first end of each of the plurality of sub-pixel units, wherein, the driving circuit further comprises:
a plurality of compensation units, each of the plurality of driving lines being defined with one of the plurality of compensation units, and the plurality of compensation units corresponding to the plurality of driving lines one to one;
wherein, each of the plurality of compensation units comprises:
a voltage compensation module comprising at least one capacitor, configured to provide a compensation voltage for an output of a corresponding driving line; and
a switch module comprising a switch tube, configured to control the voltage compensation module to discharge, when the corresponding driving line outputs a signal;
wherein capacitance values of capacitors of the plurality of compensation units are incremented from the driving line G1 to the driving line Gn with impedance values between the plurality of driving lines and the power supply incremented from the driving line G1 to the driving line Gn.

2. The driving circuit of claim 1, wherein:
a controlled end of the switch module is connected to the corresponding driving line, an output end of the switch module is also connected to the corresponding driving line, an input end of the switch module is connected to a first end of the voltage compensation module, and the input end of the switch module is also connected to a power supply;
a second end of the voltage compensation module is electrically connected to the display panel.

3. The driving circuit of claim 2, wherein:
the voltage compensation module comprises one capacitor,
a first end of the capacitor is connected to the input end of the switch module, and a second end of the capacitor is electrically connected to the display panel.

4. The driving circuit of claim 3, wherein:
a first end of the switch tube is connected to the corresponding driving line, a second end of the switch tube is also connected to the corresponding driving line, and a third end of the switch tube is connected to the first end of the voltage compensation module.

5. The driving circuit of claim 4, wherein:
an impedance value between the corresponding driving line and the power supply is proportional to a capacitance value of the at least one capacitor connected to the corresponding driving line.

6. The driving circuit of claim 4, wherein:
each of the plurality of compensation units comprises at least two capacitors with a same capacitance value,
the at least two capacitors are connected in parallel, and an impedance value between the corresponding driving line and the power supply is proportional to a number of the at least two capacitors connected to the corresponding driving line.

7. The driving circuit of claim 2, wherein:
the second end of the voltage compensation module and a gate driving unit of a liquid crystal display screen are connected to a same power supply, and the controlled end and the output end of the switch module are connected to the corresponding driving line between the gate driving unit and the sub-pixel unit.

8. A display apparatus, comprising: a display panel and the driving circuit of the display panel of claim 1.

9. The display apparatus of claim 8, wherein:
a controlled end of the switch module is connected to the corresponding driving line, an output end of the switch module is also connected to the corresponding driving line, an input end of the switch module is connected to a first end of the voltage compensation module, and the input end of the switch module is also connected to a power supply;
a second end of the voltage compensation module is electrically connected to the display panel.

10. The display apparatus of claim 9, wherein:
the voltage compensation module comprises one capacitor,
a first end of the capacitor is connected to the input end of the switch module, and a second end of the capacitor is electrically connected to the display panel.

11. The display apparatus of claim 10, wherein:
a first end of the switch tube is connected to the corresponding driving line, a second end of the switch tube is also connected to the corresponding driving line, and a third end of the switch tube is connected to the first end of the voltage compensation module.

12. The display apparatus of claim 11, wherein:
an impedance value between the corresponding driving line and the power supply is proportional to a capacitance value of the at least one capacitor connected to the corresponding driving line.

13. The display apparatus of claim 11, wherein:
each of the plurality of compensation units comprises at least two capacitors with a same capacitance value,
the at least two capacitors are connected in parallel, and an impedance value between the corresponding driving line and the power supply is proportional to a number of the at least two capacitors connected to the corresponding driving line.

14. The display apparatus of claim 9, wherein:
the second end of the voltage compensation module and a gate driving unit of a liquid crystal display screen are connected to a same power supply, and the controlled end and the output end of the switch module are connected to the corresponding driving line between the gate driving unit and the sub-pixel unit.

15. A driving method of the driving circuit of the display panel of claim 1, comprising:
switching on the switch module when the corresponding driving line is powered on; and
providing compensation charge to a voltage of the corresponding driving line by the voltage compensation module with charge storage function, when the switch module is switched on.

16. The driving method of claim 15, wherein, an impedance value between the corresponding driving line and the power supply is proportional to a quantity of the compensation charge.

* * * * *